United States Patent
Timken

(10) Patent No.: US 7,348,293 B2
(45) Date of Patent: *Mar. 25, 2008

(54) HOMOGENEOUS MODIFIED-ALUMINA FISCHER-TROPSCH CATALYST SUPPORTS

(75) Inventor: Hye Kyung C. Timken, Albany, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 286 days.

This patent is subject to a terminal disclaimer.

(21) Appl. No.: 10/728,641

(22) Filed: Dec. 5, 2003

(65) Prior Publication Data

US 2005/0124490 A1  Jun. 9, 2005

(51) Int. Cl.
B01J 23/00 (2006.01)
B01J 23/40 (2006.01)
B01J 23/42 (2006.01)
B01J 21/00 (2006.01)
B01J 20/00 (2006.01)

(52) U.S. Cl. ............... 502/327; 502/258; 502/260; 502/263; 502/328; 502/332; 502/336; 502/338; 502/341; 502/349; 502/350; 502/351; 502/355; 502/407; 502/414; 502/415; 502/439

(58) Field of Classification Search ........... 502/258, 502/260, 263, 327, 328, 332, 336, 338, 341, 502/349–351, 355, 407, 414, 415, 439
See application file for complete search history.

(56) References Cited

U.S. PATENT DOCUMENTS

| | | | |
|---|---|---|---|
| 4,257,874 A * | 3/1981 | Bergna ............... 208/111.15 |
| 4,272,409 A * | 6/1981 | Bergna ............... 502/8 |
| 4,289,653 A | 9/1981 | Jaffe | |
| 4,568,663 A | 2/1986 | Mauldin | |
| 4,683,050 A * | 7/1987 | Ward ............... 208/110 |
| 4,829,040 A * | 5/1989 | Ward ............... 502/206 |
| 4,988,659 A * | 1/1991 | Pecoraro ............... 502/235 |
| 5,030,780 A * | 7/1991 | Ward et al. ............... 585/269 |
| 5,391,364 A * | 2/1995 | Cogliati ............... 423/335 |
| 5,733,839 A | 3/1998 | Espinoza et al. | |
| 5,834,522 A | 11/1998 | Mignard et al. | |
| 5,849,852 A * | 12/1998 | Koch et al. ............... 526/96 |
| 6,476,085 B2 | 11/2002 | Manzer et al. | |
| 6,586,481 B2 | 7/2003 | Pederzani et al. | |
| 6,734,133 B1 * | 5/2004 | Weisbeck et al. ............... 502/119 |
| 6,872,685 B2 * | 3/2005 | Timken ............... 502/263 |
| 6,902,664 B2 * | 6/2005 | Timken ............... 208/111.01 |

(Continued)

FOREIGN PATENT DOCUMENTS

EP  1 050 571 A1  8/2000

(Continued)

Primary Examiner—Cam N. Nguyen
(74) Attorney, Agent, or Firm—Steven H. Roth

(57) ABSTRACT

A homogeneous, amorphous catalyst support comprising a modifying-metal-oxide and a base-metal oxide, the catalyst support having a Surface to Bulk modifying-metal/base-metal atomic ratio of from about 0.6 to about 1.3 and exhibiting an X-ray diffraction having broader line width and lower intensity than is exhibited by the base-metal oxide is disclosed. More specifically, a homogeneous, amorphous silica-modified-alumina catalyst support useful in the Fischer-Tropsch process is disclosed. A silica-modified-Alumina catalyst support of the present invention maintains the desirable properties of alumina and exhibits higher resistance to acid than unmodified alumina.

18 Claims, 2 Drawing Sheets

U.S. PATENT DOCUMENTS

| | | |
|---|---|---|
| 6,995,112 B2 | 2/2006 | Timken et al. |
| 2003/0139286 A1 | 7/2003 | Van Berge et al. |
| 2003/0144367 A1 | 7/2003 | Van Berge et al. |
| 2003/0162849 A1 | 8/2003 | Van Berge et al. |

FOREIGN PATENT DOCUMENTS

| | | |
|---|---|---|
| WO | WO 03/012008 A2 | 2/2003 |

\* cited by examiner

XRD of Alumina and Silica-Modified Alumina Support

HOMOGENEOUS MODIFIED-ALUMINA FISCHER-TROPSCH CATALYST SUPPORTS

FIELD OF THE INVENTION

This invention relates to improved catalyst supports. More specifically, this invention relates to a homogeneous, amorphous modified-Alumina cogel material, the attributes of which make it especially useful for use as a support for Fischer-Tropsch catalysts.

BACKGROUND OF THE INVENTION

The preparation of hydrocarbons from synthesis gas is well known in the art and is usually referred to as Fischer-Tropsch synthesis, the Fischer-Tropsch process, or Fischer-Tropsch reaction(s). Catalysts for use in such synthesis usually contain a catalytically active Group VIII metal supported on a carrier. The support may be alumina, silica, titania, zirconia, magnesia and their mixtures. The Group VIII metals, iron, cobalt, nickel, and ruthenium have been often used as the catalytically active metals. Cobalt and iron have been found to be most suitable for catalyzing a process in which synthesis gas is converted to primarily hydrocarbons having five or more carbon atoms. Additionally, the catalysts often contain one or more promoters. The catalyst promoter may be a basic oxide such as $ThO_2$, $La_2O_3$, MgO, $ZrO_2$, and $TiO_2$, although promoters may also comprise noble metals such as Pt, Pd, Ru, Rh, Os, and Ir; coinage metals such as Cu, Ag, and Au; and other transition metals such as Fe, Mn, Ni, and Re. Fischer-Tropsch catalysts and processes are described in U.S. Pat. Nos. 6,476,085; 6,586,481; and 4,568,663. The active metal may be incorporated into the base by impregnation, drying and calcination as disclosed in U.S. Patent Application 2003/0162849 A1 to van Berge et al.

Alumina is one of the most desirable supports in catalysis. Due to its high surface area and good mechanical properties, particularly gamma form of alumina has been used widely in industry for many catalytic applications. However, in an acidic or alcohol containing reaction medium such as Fischer-Tropsch synthesis conditions to produce wax, or other reactions proceeding in aqueous medium such as alcohol, ether, and ester syntheses, an alumina support exhibits a stability problem. Alumina may dissolve or leach slowly in the reactor due to attacks of acid and alcohol byproducts in the reaction medium. Dissolution of alumina support in acid medium is expected to be detrimental in catalyst stability. The dissolution problem may cause poor maintenance of catalyst integrity and possible fines generation. Possible fines generation will hurt the subsequent filtration and post processing operations. High metal or metal compound content in a Fischer-Tropsch product is undesirable because such contaminants could have adverse effects for the Fischer-Tropsch process, such as causing reactor plugging or significantly reducing catalyst life. As a result, it is important that the product of the Fischer-Tropsch process be free of metal and other contaminants that could adversely affect its subsequent processing.

Thus it is highly desirable to have a catalyst support with the favorable characteristics of an alumina support with much improved acid resistance.

U.S. Pat. No. 5,733,839 to van Berge et al. shows that silica coating on gamma alumina particles improves dissolution tendency of alumina and the silica-coated alumina support is useful as a Fischer-Tropsch synthesis catalyst. U.S. Patent Application 2003/0162849 A1 to van Berge et al. shows that silica-coated alumina prepared via in situ coating in a slurry of aluminum hydroxylate prior to spray drying is also useful as a support for a Fischer-Tropsch synthesis catalyst. Daniell et al. studied the latter material in depth using FT-IR and XPS and showed that little mixing of the two oxide phases take place on the surface so the surface can be depicted as comprising two separate oxide phases (Applied Catalysis A: 196, 247-260, 2000).

SUMMARY OF THE INVENTION

This invention relates to a homogeneous, amorphous catalyst support comprising a modifying-metal-oxide and a base-metal oxide, in which the modifying-metal-oxide is homogeneously distributed throughout the base-metal oxide, the catalyst support having a Surface to Bulk modifying-metal/base-metal atomic ratio of from about 0.6 to about 1.3 and exhibiting an X-ray diffraction having broader line width and lower intensity than is exhibited by the base-metal oxide. More specifically, the present invention relates to a homogeneous, amorphous silica-modified-Alumina catalyst support having a Surface to Bulk Si/Al ratio of from about 0.6 to about 1.3 and exhibiting an X-ray diffraction having broader line width and lower intensity than is exhibited by unmodified alumina. A silica-modified-Alumina catalyst support of the present invention maintains the desirable properties of alumina and exhibits higher resistance to acid than unmodified alumina.

DETAILED DESCRIPTION

Figure 1:
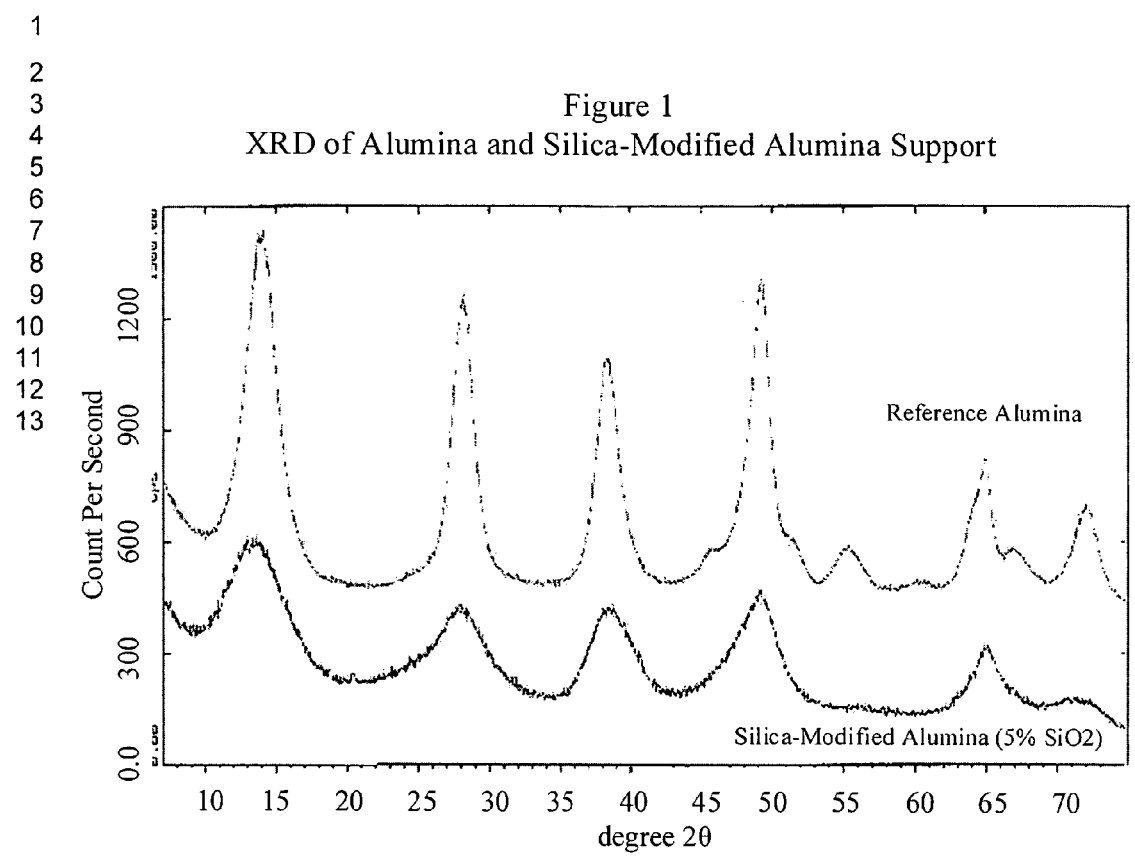
FIG. 1 is a Powder X-ray diffraction of alumina and silica-modified alumina.

The following detailed description is made with reference to a preferred embodiment of the invention, a silica-modified alumina Fischer-Tropsch catalyst support. It is not the intention that the invention be construed in this limited fashion. Other metal oxides may be used as support materials. For example, the base-metal oxides may be alumina, silica, titania and their mixtures. The base-metal oxides may be modified with modifying-metal-oxides such as silica, titania, zirconia, magnesia and their mixtures. The materials described may be used as a catalyst support for catalysts other than Fischer-Tropsch catalysts. Other variations will be apparent to the skilled artisan base on the description herein.

As more fully described herein, an acid resistant alumina support is prepared by cogellation of a homogeneous solution containing alumina and a small amount of silica. Upon calcination, the process produces gamma-type amorphous alumina with silicon dioxide incorporated uniformly throughout the structure. Aluminum leaching of this catalyst by acid attack is significantly reduced in this homogeneous silica-modified alumina support. This type of support may show advantages over the silica-coated alumina support when the reaction conditions are vigorous and cause attrition of catalyst particles. A silica-coated alumina support may lose its coating upon attrition in a reactor, whereas a catalyst support in accordance with the present invention will maintain its acid resistance uniformly throughout.

As noted previously, the base support may be composed of alumina, silica, titania, magnesia and their mixtures.

Alumina is the preferred base-metal oxide. Where the base support is alumina, the alumina component may have any phase form selected from eta, gamma, delta, theta, alpha and their mixtures, it is preferred that the base support is alumina in the gamma phase. The base material in the support is generally present in concentrations of from about 70 wt % or greater. Desirable base support content is from about 70-99.75 wt % of base-metal oxide, preferably 80-99.5 wt %, and most preferably 90-99 wt %.

Silica is the preferred modifier for alumina. Alternative modifiers can be titania, zirconia, magnesia, and mixtures thereof. Desirable modifier content is from about 0.25-30 wt % of modified oxide, preferably 0.5-20 wt %, and most preferably 1-10 wt %. The modified-Alumina composition of the present invention is homogeneous. This means that silicon dioxide is incorporated uniformly throughout the structure of the particles. Two different indicators are described that demonstrate that silicon dioxide incorporation is uniform and that the composition is homogeneous.

First, a "Surface to Bulk Si/Al Ratio" (SB Ratio) is a measure used to indicate that the modified-Alumina of the present invention is homogeneous.

$$SB\ Ratio = \frac{(Si/Al\ atomic\ ratio\ of\ the\ surface\ measured\ by\ XPS)}{(Si/Al\ atomic\ ratio\ of\ the\ bulk\ measured\ by\ elemental\ analysis)}$$

To determine the SB ratio, the Si/Al atomic ratio of the silica-modified alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition. Use of XPS for silica-Alumina characterization was published by W. Daniell et al. in Applied Catalysis A, 196, 2000, pp 247-260. The XPS technique is, therefore, effective in measuring the chemical composition of the outer layer of catalytic particle surface. Other surface measurement techniques, such as Auger electron spectroscopy (AES) and Secondary ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the SB ratio and the homogeneity of the material is determined. How the SB ratio defines the homogeneity of a particle is explained as follows. An SB ratio of 1.0 means the material is completely homogeneous throughout the particles. An SB ratio of less than 1.0 means the particle surface is enriched with aluminum (or depleted with silicon), and aluminum is predominantly located on the external surface of the particles. The SB ratio of more than 1.0 means the particle surface is enriched with silicon (or depleted with aluminum), and aluminum is predominantly located on the internal area of the particles.

A silica-modified-Alumina composition is homogeneous when its Surface to Bulk ratio (SB ratio), i.e., the ratio of the Si/Al atomic ratio of the composition measured by XPS at the surface and the Si/Al atomic ratio of the bulk measured by elemental analysis is from about 0.6 to about 1.3. The SB ratio is preferably from about 0.8 to about 1.2, more preferably from about 0.9 to about 1.1, and most preferably 1.0.

A second indicator of the homogeneity of the silica-modified-Alumina of the present invention is the breadth of the linewidth of the X-Ray Diffraction peaks. As will be seen in the Examples, the linewidth of each or the XRD peaks is significantly broader for the silica-modified-Alumina as compared to a reference unmodified alumina. For example, the full-width-at-half-height (FWHH) of the 38.5 degree 2θ peak, showed a linewidth that was increased by 113% compared to the reference alumina.

In addition to being homogeneous, the silica-modified-Alumina compositions of the present invention are amorphous, having a lower relative crystallinity than the reference unmodified alumina. The amorphous nature of the compositions of the present invention is shown by comparing the X-ray diffraction patterns of modified and unmodified compositions. As will be seen further in the Examples, the silica-modified-Alumina has an overall intensity substantially lower than the reference alumina, which indicates that is more amorphous than the reference. In one instance, the relative crystallinity was estimated to be 58% of the reference by integrating the 38.5 degree 2θ peak.

Silica-modified-Alumina according to the present invention is preferably prepared by a cogel process. It may be prepared by a variety of methods employing batch and continuous processes in different combinations. The silica-modified-Alumina is preferably prepared in accordance with the methods disclosed in commonly assigned U.S. patent application Ser. No. 10/291,114 titled "Method for Preparing A Highly Homogenous Amorphous Silica-Alumina Composition", filed Nov. 8, 2002 and incorporated by reference herein.

The two most important steps in the preparation of a silica-modified alumina cogel are (1) preparation of the clear sol containing silica and alumina and (2) gellation of the sol using a base solution. See U.S. Pat. No. 4,289,653, Jaffe and U.S. Pat. No. 4,988,659, Pecoraro, both of which are incorporated by reference herein.

The starting materials for the sol preparation step include aluminum salt, acid, and a silica source. The aluminum salt source that can be used for the synthesis includes aluminum sulfate, aluminum nitrate, aluminum chloride, aluminum bromide, aluminum iodide, aluminum acetate, aluminum alkoxide, aluminum carboxylate, and aluminum metal or alumina dissolved in acid. Feasible acid sources include acetic acid, formic acid, sulfuric acid, hydrochloric acid, and nitric acid. The silicate sources include, but are not limited to, sodium silicate, precipitated silica dissolved in a base, and colloidal silica.

The sol preparation can be done either via a batch process or a continuous process. It is critical to maintain the pH less than 3.0, preferably less than 2.5, and to ensure vigorous and complete mixing of the aluminum salt and silicate solutions to minimize any unwanted gel or particle formation.

A basic precipitant such as ammonium hydroxide is then added to the acidified sol solution. The addition of the precipitant raises the pH of the sol above 3, resulting in cogelling the silica and alumina species. Dilute ammonia solution is the preferred base for the gellation. In addition to dilute ammonia, other bases such as NaOH, NaAlO$_2$, KOH or organic amine derivatives can also be used for the gellation. It is preferable to use an inorganic base for its lower cost.

The gellation step can be done either via batch process or continuous process. The desirable final gellation pH is in the range of 5-9, preferably 6-8. It is critical to have complete, vigorous mixing of the Si-Al solution with the basic precipitant, and to maintain uniform pH throughout the mixture during the precipitant addition step in order to minimize formation of isolated silica domains and alumina domains.

The precipitated cogel needs to be washed to remove any unreacted silicate and aluminum salt, and then it is ammonium exchanged to remove sodium. The cogel should be aged for approximately 2-5 hours at room temperature or at an elevated temperature of up to about 90° C. and the aged cogel may be spray-dried for convenience in handling and storage, or for preparation of support for fluidized bed catalyst. The wet cake may be further processed to the final catalyst from the moist state.

The preferred method of drying and calcining of spherical form of supports includes an initial spray drying step in an air-purged dryer at 260-450° C. and a final calcination at 480-850° C. for 0.5-12 hours in a furnace or kiln.

If desired, the material may be extruded to produce a fixed-bed catalyst or catalyst support. The silica-modified alumina as-is or in combination with other ingredients can be formed by adding sufficient amount of water to produce a moisture content of approximately 60% by weight. After mulling for approximately 1 hour, optionally in the presence of peptizing acid or base, the material will attain a plastic or doughy state which is suitable for extrusion in commercial extrusion apparatus. The extrudates then needs to be dried and calcined. The preferred method of drying and calcining includes an initial drying step in an air-purged oven at 65-175° C. and a final calcination at 480-850° C. for 0.5-12 hours in a furnace or kiln. These and other methods of finishing the material are set forth in U.S. Pat. No. 4,289,653, Jaffe, incorporated by reference herein.

EXAMPLES

The following Examples are illustrative of the present invention, but are not intended to limit the invention in any way beyond what is contained in the claims which follow.

Example 1

Synthesis of Silica-Modified-Alumina (2.5% $SiO_2$/97.5% $Al_2O_3$)

An acidic aluminum solution (Solution I containing 10 wt % $Al_2O_3$) was prepared by dissolving 2309 g of $AlCl_3 6H_2O$ and 13.7 g of hydrochloric acid (37% concentrated) in 2553 g of deionized water. A dilute solution of sodium silicate (Solution II containing 0.30 wt % $SiO_2$) was prepared by diluting 43.6 g of concentrated sodium silicate solution (contains 29 wt % $SiO_2$ and 9% $Na_2O$) with deionized water. The alumina/hydrochloric acid solution (Solution I) and the silicate solution (Solution II) were pumped separately and simultaneously into the mixing chamber of an in-line blender. Mixing in the in-line blender was vigorous with 1600 RPM blender-blade rotation. The volume of the mixing chamber is smaller than the total volume of solutions pumped in 1 minute (i.e., less than 1 minute residence time per volume). The mixing produced a clear silica and alumina solution at the outlet of the inline blender (Solution III). The pH of the Solution III ranged 1.5-1.7. The Solution III contained Si/Al atomic ratio of 0.022
$H^+/Na^+$ molar ratio of 1.1

Then the product from the in-line blender (Solution III containing the silica and alumina sol) and the dilute ammonia solution (Solution IV containing 8 wt % $NH_3$) were pumped separately and simultaneously into the mixing chamber of a second in-line blender for gel formation. The rate of the ammonia solution was adjusted to maintain the pH of the gel product at 7±0.5. The mixing in the in-line blender was again vigorous with 1600 RPM blender-blade rotation. The gel product was collected and then aged at room temperature for 2 hours while stirring. This cogelled silica-modified alumina was filtered to produce a filtered cake. The cake was washed with deionized water followed by an ammonium exchange with a hot solution of ammonium nitrate (8.3 wt %, 24 L solution) for 15 minutes, and then rinsed with 48 L of deionized water. The final cake was dried at 250° F. overnight. The silica-modified alumina was sized to small pieces and calcined under excess dry air at 1000° F. for 1 hour for activation. Another sample was calcined at 1200° F. for 1 hour to produce material with different porosity. Physical properties of the final silica-modified alumina are summarized in Table 1.

Example 2

Synthesis of Silica-Modified Alumina (5% $SiO_2$/95% $Al_2O_3$)

The preparation procedure of this silica-modified alumina was similar to Example 1. The concentrations of Solution I and Solution II are modified to produce a combined solution of silica and alumina to a composition of Si/Al atomic ratio of 0.045
$H^+/Na^+$ molar ratio of 1.1

Then the product from the in-line blender (Solution III containing the silica and alumina sol) and the dilute ammonia solution (Solution IV containing 8 wt % $NH_3$) were pumped separately and simultaneously into the mixing chamber of a second in-line blender for gel formation. Then the gel product was purified via ammonium exchange and deionized water rinse. Physical properties of the final silica-modified alumina are summarized in Table 1.

Example 3

Synthesis of Silica-Modified Alumina (10% $SiO_2$/90% $Al_2O_3$)

The preparation procedure of this-silica-modified alumina was similar to Example 1. The concentrations of Solution I and Solution II are modified to produce a combined solution of silica and alumina to a composition of Si/Al atomic ratio of 0.094
$H^+/Na^+$ molar ratio of 1.1

Then the product from the in-line blender (Solution III containing the silica and alumina sol) and the dilute ammonia solution (Solution IV containing 8 wt % $NH_3$) were pumped separately and simultaneously into the mixing chamber of a second in-line blender for gel formation. Then the gel product was purified via ammonium exchange and deionized water rinse. Physical properties of the final silica-modified alumina are summarized in Table 1.

Example 4

Commercial Alumina Base Case (100% $Al_2O_3$, Non-Invention)

Physical properties of commercial pseudoboehmite alumina (Catapal B from Sasol Condea) were compared with the present silica-modified alumina. The pseudoboehmite alumina was calcined under excess dry air at 1000° F. for 1 hour to convert to the gamma—form of alumina. Another sample was calcined at 1200° F. for 1 hour to produce gamma alumina with different porosity. Physical properties of the final gamma alumina are summarized in Table 1.

TABLE 1

Physical Properties and Conversion Activity of Silica-Modified Alumina Compositions

| | Reference, Gamma Alumina | Silica-Modified Alumina Invention (Example 1) | Silica-Modified Alumina Invention (Example 2) | Silica-Modified Alumina Invention (Example 3) |
|---|---|---|---|---|
| Nominal $SiO_2$ Content, wt % | 0 | 2.5 | 5 | 10 |
| Porosity after 1000° F. calcinations | | | | |
| Surface area, $m^2/g$ | 293 | 338 | 365 | 412 |
| Total pore volume, cc/g | 0.43 | 0.47 | 0.44 | 0.58 |
| Porosity after 1200° F. calcinations | | | | |
| Surface area, $m^2/g$ | 217 | 293 | 318 | 378 |
| Total pore volume, cc/g | 0.51 | 0.48 | 0.46 | 0.58 |
| Na, wt % | — | <0.05 | <0.05 | <0.05 |
| Bulk Si/Al atomic ratio, by elemental anal. | 0 | 0.020 | 0.041 | 0.093 |
| Surface Si/Al atomic ratio, by XPS | — | 0.013 | 0.031 | 0.075 |
| Surface to Bulk Si/Al Ratio | — | 0.64 | 0.75 | 0.80 |
| XRD, % crystalline alumina phase (38.5° 2θ peak) | 100% (base) | 72% | 58% | 59% |
| XRD, % linewidth (38.5° 2θ peak) | 100% (base) | 163% | 213% | 244% |
| $nC_6 + iC_6$ Model Compound Testing (a) | | | | |
| Total conversion, wt % | 3.1 | — | 4.7 | 3.9 |
| $nC_6$ conversion, wt % | 2.0 | — | 2.3 | 1.8 |
| $iC_6$ conversion, wt % | 4.1 | — | 7.1 | 5.9 |
| Isopropylamine TPAD, mmol/g | base | — | Lower than the base | — |

(a) Model compound testing was performed at 950° F., 0.68 WHSV of the combined hydrocarbon feed.

The present silica-modified alumina shows excellent physical properties as shown in Table 1. The silica-modified alumina samples show comparable or higher surface area and pore volume than the reference alumina. The present silica-modified alumina shows better resistance to heat treatment in that it maintains the surface area better.

The bulk Si/Al ratios of the silica-modified alumina samples in Table 1 are nearly identical to the compositions of the synthesis medium (Solution III, combined solution of silica and alumina). This indicates that silica incorporation is stoichiometric, nearly complete incorporation of silica into the alumina structure. The surface Si/Al ratios measured by XPS show comparable values to the bulk Si/Al ratios. The surface-to-bulk Si/Al ratios are close to 1 indicating the Si distribution in the material is uniform and homogeneous.

FIG. 1 compares the powder X-ray diffraction (XRD) pattern of commercial pseudoboehmite alumina to the present homogeneous silica-modified alumina (5 wt % $SiO_2$ case, Example 2) in dried-only form. The present silica-modified alumina exhibits two distinct characteristics. First, the overall intensity of the X-ray diffraction of the silica-modified-Alumina is substantially less than the reference alumina indicating more amorphous nature of the material. By integrating the 38.5 degree 2θ peak, it has an estimated 58% relative crystallinity compared to the reference alumina. Secondly, the linewidth of each XRD peaks are significantly broader, more than twice, than the reference alumina. By measuring the full-width-at-half-height (FWHH) of the 38.5 degree 2θ peak, it is determined that the linewidth was increased by 113% compared to the reference alumina. The other silica-modified alumina samples exhibit the exact same behavior as reported in Table 1. The features of lower relative crystallinity and broader linewidth indicate that the present silica-modified alumina is very homogeneous in nature and the domain size of the alumina crystallites is significantly smaller than the reference alumina (much less than 100 Å).

All silica-modified-Alumina samples showed desirable low activity for hydrocarbon conversion as shown with the model compound testing.

Example 2 showed 4.7% total hydrocarbon conversion and Example 3 showed 3.9% conversion, comparable to the reference alumina sample with 3.1% conversion. Temperature programmed amine desorption study also shows that the support acidity of the present silica-modified alumina is comparable to or lower than that of reference gamma alumina. Low acidity of the support is desirable for metal catalyzed reactions where severe isomerization and cracking are undesirable, such as Fischer-Tropsch wax synthesis conditions.

Example 5

Acid Resistance Test

A method to obtain cumulative aluminum ion dissolution profile was disclosed U.S. Pat. No. 5,733,839 to van Berge et al. in that concentration of aluminum ions was estimated using conductivity measurements at a constant pH as a function of time.

Figure 2:
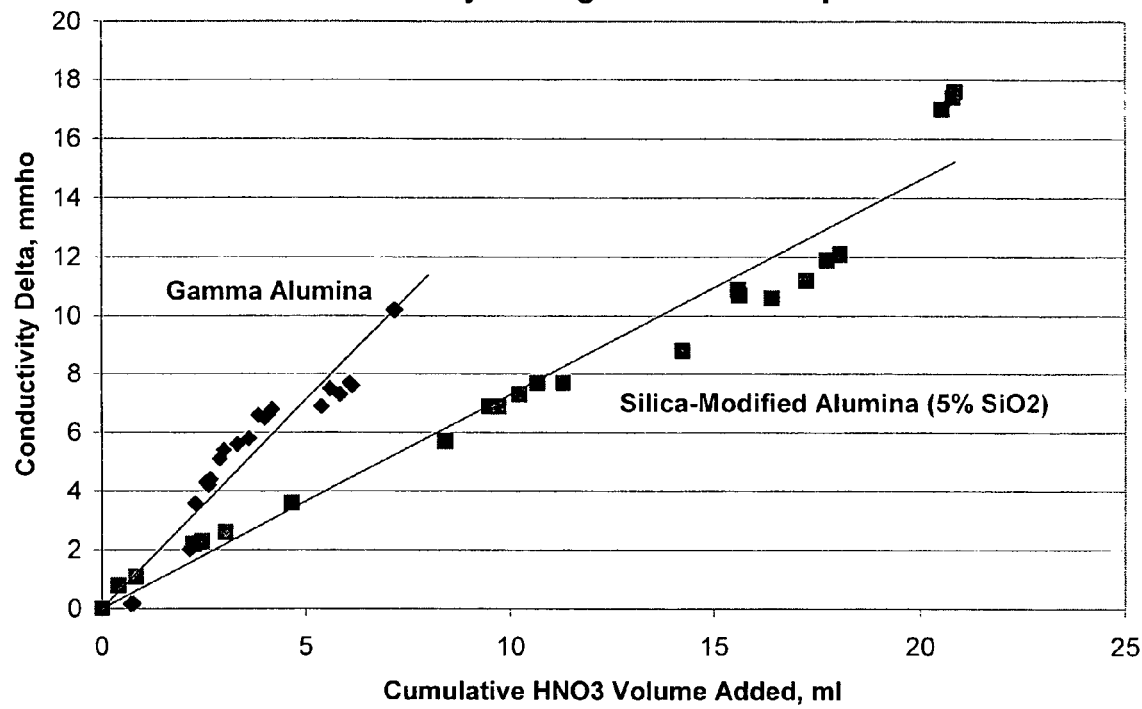
FIG. 2 is a graph showing conductivity change as a function of time.

In the present case, behavior of a support in an acid medium was evaluated by observing a conductivity change in the acid medium using a procedure similar to that disclosed by van Berge et al. For this experiment, 2 g of a support sample, which was calcined earlier at 1350° F. for 1 hour, was slurried in a dilute nitric acid solution. Then the conductivity change was monitored for 50-60 hours while maintaining the slurry pH at 2.0 using an automatic titrator. The conductivity change (delta) is due to aluminum dissolution to form $Al^{3+}$ and other charged particles in the slurry. Thus the higher conductivity indicates higher dissolution tendency of the support. The conductivity change is plotted as a function time in FIG. 2. The figure clearly indicates that silica-modified alumina shows much lower conductivity increase than pure gamma alumina at constant acid consumption, demonstrating the present silica-modified alumina exhibits improved acid resistance.

While not being bound by any particular theory, the acid resistance of the present homogeneous silica-modified-Alumina support may come from very fine domain of alternating silica and alumina phases in the support. The close chemical bonding may generate very effective binding sites for alumina and hydrolyzed aluminum species. Even the digested alumina in the acid medium (partially hydrolyzed colloidal alumina) will be attached to the support with the stronger binding force. As a result, the homogeneous silica-modified-Alumina is expected to generate much lower content of "soluble" aluminum species in a catalysis process that contains aqueous medium.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A homogeneous, amorphous cogel catalyst support comprising a modifying-metal-oxide and a base-metal oxide, wherein the modifying-metal-oxide is homogeneously distributed throughout the base-metal oxide, the catalyst support having a Surface to Bulk modifying-metal/base-metal atomic ratio of from about 0.9 to about 1.1 and exhibiting an X-ray diffraction having broader line width and lower intensity than is exhibited by the base-metal oxide.

2. A catalyst support according to claim 1, wherein the modifying-metal-oxide is selected from the group consisting of silica, titania, zirconia, magnesia and mixtures thereof.

3. A catalyst support according to claim 1, wherein the base-metal-oxide is selected from the group consisting of alumina, silica, titania and mixtures thereof.

4. A catalyst support according to claim 3, wherein the modifying-metal-oxide is selected from the group consisting of silica, titania, zirconia, magnesia and mixtures thereof.

5. A catalyst support according to claim 4, wherein the base-metal oxide is alumina and the modifying-metal-oxide is silica.

6. A catalyst support according to claim 5, wherein the catalyst support comprises from about 70 wt % to about 99.75 wt % alumina.

7. A catalyst support according to claim 5, wherein the catalyst support comprises from about 90 wt % to about 99 wt % alumina.

8. A catalyst support according to claim 5, which has been prepared by a cogel process.

9. A homogeneous, amorphous silica-modified-alumina cogel catalyst support having a Surface to Bulk Si-Al ratio of from about 0.9 to about 1.1 and exhibiting an X-ray diffraction having broader line width and lower intensity than is exhibited by unmodified alumina.

10. A catalyst support according to claim 9, wherein the Surface to Bulk Si/Al ratio is from about 1.0.

11. A catalyst support according to claim 9, wherein the catalyst support comprises from about 70 wt % to about 99.75 wt % alumina.

12. A homogeneous, amorphous silica-modified-alumina cogel catalyst support exhibiting an X-ray diffraction having a broader line width and lower intensity than is exhibited by unmodified alumina.

13. A catalyst support according to claim 12, wherein the full line width is 50% greater than the line width of unmodified alumina when measured at half height.

14. A catalyst support according to claim 12, wherein the intensity is at least 25% lower than for the unmodified alumina.

15. A catalyst for the Fischer-Tropsch process comprising a homogeneous, amorphous cogel catalyst support comprising a modifying-metal-oxide and a base-metal oxide, wherein the modifying-metal-oxide is homogeneously distributed throughout the base-metal oxide, the catalyst support having a Surface to Bulk modifying-metal/base-metal atomic ratio of from about 0.9 to about 1.1 and exhibiting an X-ray diffraction having broader line width and lower intensity than is exhibited by the base-metal oxide and a catalytically active Group VIII metal.

16. A catalyst according to claim 15, further comprising at least one promoter.

17. A catalyst according to claim 15, wherein the modifying-metal-oxide is selected from the group consisting of silica, titania, zirconia, magnesia and mixtures thereof, the base-metal-oxide is selected from the group consisting of alumina, silica, titania and mixtures thereof.

18. A catalyst according to claim 17, wherein the catalytically active Group VIII metal is selected from the group consisting of cobalt, iron and mixture thereof.

* * * * *